United States Patent [19]
Gentile et al.

[11] Patent Number: 5,096,720
[45] Date of Patent: Mar. 17, 1992

[54] METHOD FOR ENHANCING DESIRABLE PHYSICAL AND ORGANOLEPTIC PROPERTIES OF FOOD PRODUCTS

[75] Inventors: Dorothy J. Gentile, Somerville; Joseph M. Light, Bridgewater, both of N.J.

[73] Assignee: National Starch and Chemical Investment Holding Corporation, Wilmington, Del.

[21] Appl. No.: 510,701

[22] Filed: Apr. 18, 1990

Related U.S. Application Data

[62] Division of Ser. No. 238,705, Aug. 31, 1988.

[51] Int. Cl.⁵ .................... A23L 1/187; A23L 1/39
[52] U.S. Cl. ...................... 426/61; 426/549; 426/20; 426/572; 426/579; 426/589
[58] Field of Search .............. 426/549, 61, 20, 21, 426/27, 572, 579, 589

[56] References Cited

U.S. PATENT DOCUMENTS

| | | | |
|---|---|---|---|
| 3,048,490 | 8/1962 | Lunstedt | 99/116 |
| 3,535,121 | 10/1967 | Luksas | 99/116 |
| 3,653,921 | 4/1972 | Buhler et al. | 99/140 |
| 3,962,164 | 8/1976 | Sozi | 426/43 |
| 4,292,333 | 9/1981 | Bosco et al. | 426/335 |
| 4,310,554 | 1/1982 | Olson et al. | 426/40 |
| 4,414,229 | 11/1983 | Bakal et al. | 426/98 |
| 4,454,160 | 6/1984 | Jonsson et al. | 426/34 |
| 4,533,561 | 8/1985 | Ward | 426/603 |
| 4,606,926 | 8/1986 | Wiles et al. | 426/603 |
| 4,617,273 | 10/1980 | Olsen et al. | 435/232 |
| 4,656,045 | 4/1987 | Bodor et al. | 426/601 |
| 4,670,267 | 6/1987 | Chang et al. | 426/41 |
| 4,684,532 | 8/1987 | Izzo | 426/533 |

FOREIGN PATENT DOCUMENTS

| | | |
|---|---|---|
| 71849 | 4/1987 | Australia . |
| 247646 | of 0000 | European Pat. Off. . |
| 93517 | 2/1957 | Netherlands . |
| 1516786 | 7/1978 | United Kingdom . |

*Primary Examiner*—Joseph Golian
*Attorney, Agent, or Firm*—Mary E. Porter; Eugene Zagarella, Jr.; Edwin M. Szala

[57] ABSTRACT

This invention presents a method for improving and enhancing certain desirable physical and organoleptic properties of baked, whipped, and blended food products. The improvement is achieved by adding to the products, prior to preparation, an effective amount of a ferment produced by the fermentation of dairy product with a culture of *Streptococcus diacetilactis*, optionally mixed with *Streptococcus lactis* and/or *Streptococcus cremoris*.

9 Claims, 4 Drawing Sheets

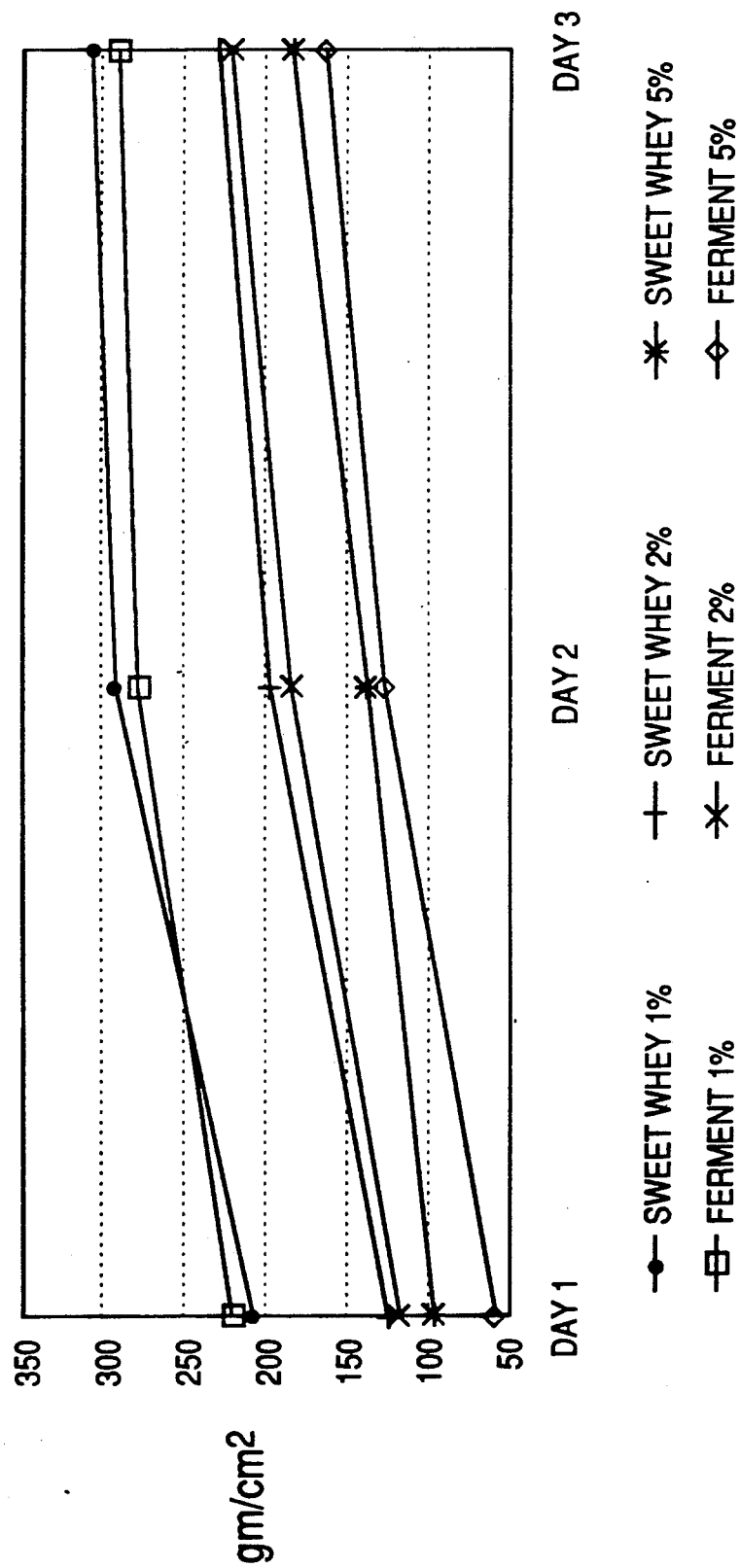

METHOD FOR ENHANCING DESIRABLE PHYSICAL AND ORGANOLEPTIC PROPERTIES OF FOOD PRODUCTS

This application is a division of application Ser. No. 07/238,705, filed Aug. 31, 1988.

FIELD OF INVENTION

This invention relates to a method whereby certain desirable physical and organoleptic properties of food products are enhanced by use of a cultured ferment of pasteurized milk products and to food products produced by that method.

BACKGROUND OF INVENTION

For years, practitioners have used diacetyl (2,3-butanedione) as an additive to foodstuffs, such as oleomargarine, because of its properties which imparts a butter-like flavor and aroma to foods. However, the substance is quite volatile and quickly evaporates at ambient temperature. Thus, steps must be taken to increase the amount of time it remains in the food. A variety of methods are available for the incorporation of this substance into foods, which impede the loss of the compound thereby extending the "life" of the foods.

One such method is discussed in Netherlands Patent Application 86-01078, filed Apr. 25, 1986, and published Nov. 16, 1987, and corresponding European Patent Application 247646 published Dec. 2, 1987. In this method, a pasteurized milk product is fermented by *Streptococcus diacetilactus* (and optionally, *Streptococcus Lactis* and/or *Streptococus cremoris*) under conditions which result in a high concentration of diacetyl and its precursor, alpha acetolactic acid, in the spent fermentation medium (ferment). The ferment is then dried and added to food products, especially butter substitutes, imparting a buttery flavor and aroma to them. The alpha acetolactic acid, which is much less volatile than diacetyl, will gradually convert to diacetyl, providing a prolonged presence of diacetyl to the product. However, there is no disclosure as to the effect of this ferment on other properties of the food.

A variety of products are also added to foodstuffs to enhance desirable organoleptic textural properties such as mouthfeel. These products which include cultured buttermilk, sour cream, and various starches and gums, each have their own strengths and weaknesses for such use, but in general, relatively large amounts of each are required to obtain the desirable amount of enhancement.

There exists a real need for additives which will produce desirable textural properties such as mouthfeel viscosity, smoothness/creaminess, and softness/more extensive structure (in baked goods) in foodstuffs.

SUMMARY OF THE INVENTION

This invention presents a process whereby certain desirable physical and organoleptic properties of baked, whipped, and blended food products can be enhanced. More specifically, this invention presents a method for enchancing these properties by adding minor amounts of a dried dairy product ferment to the food product during preparation.

The ferment is produced by the fermentation of a milk product, preferably whey, with a culture of *Streptococcus diacetilactus* , optionally, with *Streptococcus lactis* and/or *Streptococcus cremoris*, following the procedure described in Netherlands Patent Application 86-01078, published Nov. 16, 1987, and corresponding European Patent Application 247646, published Dec. 2, 1987, in name of Unilever, N. V., both of which are incorporated herein by reference. This product, which can contain high levels of diacetyl and alpha acetolactic acid, has been utilized as a buttery aroma (and flavor) enhancer in foods. Surprisingly, however, it has been found that the ferment will also impart many desirable physical and organoleptic properties to baked, whipped, and blended food products. These improvements are observed independently of diacetyl and alpha acetolactic acid content and, in fact, can be observed when the concentration of these compounds in the dried ferment is very low (below 50 ppm).

The product can be used in baked goods such as cookies, cakes, and breads; whipped products such as icings and whipped toppings; and blended products such as gravies, puddings, mousses, soups, and sauces. In each of these, addition of the dried ferment during the preparation process will result in products having enhanced textural properties.

In baked products, the ferment produces a more extensive cell structure, a softer texture, a greater height, and a desirable doming or rounding at the top of each layer after baking. In whipped and blended products, the ferment produces a richer creamier texture with a desirable viscosity. Whipped products are especially creamier and more pleasing. In all three types of foods, the ferment produces a more desirable mouthfeel.

The ferment is added to these products in an amount ranging from 0.1 to 10% (by wt.), preferably 0.2 to 5% with the actual quantity used being determined by nature of the food product and the desired result.

BRIEF DESCRIPTION OF THE FIGURES

FIG. 1. is a graphical representation of cupcake texture versus time at 1%,2%, and 5% (by wt.) levels of ferment or sweet whey.

DETAILED DESCRIPTION OF INVENTION

Figure 2A:
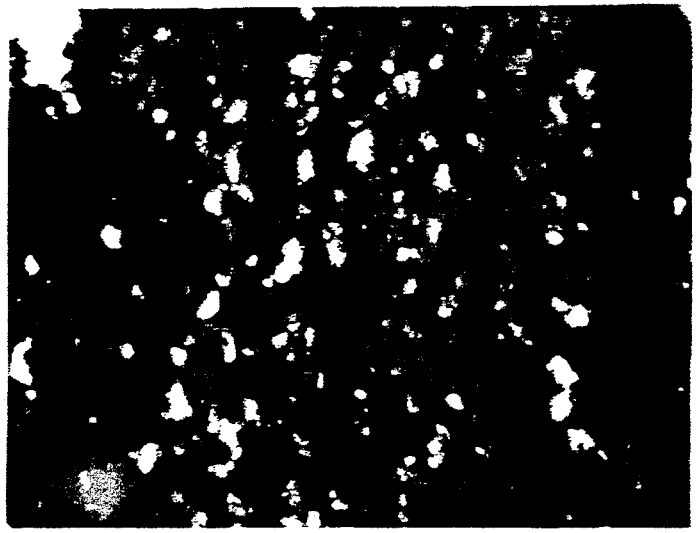
FIG. 2 is a composite of micrographs exhibiting the cellular structure in cupcakes obtained with 5% (by wt.) ferment containing 500 ppm diacetyl and/or alpha acetolactic acid)and sweet whey, at an 8× magnification.

The dried ferment used in the processes of this invention is prepared by the procedure as described in Netherlands Pat. Application 86-1078, and corresponding European Patent Application 247646, published Dec. 2, 1987, in the name of Unilever N. V., both of which were incorporated by reference supra. Briefly, a pasteurized milk product, such as whey, is fermented with a *Streptococcus diacetilactus* culture, optionally mixed with cultures of *Streptococcus lactis* and/or *Streptococcus cremoris*. Preferably the cultured microorganism will produce a high concentration of alpha acetolactic acid (a precursor to diacetyl) in the ferment, but such is not mandatory and it has been found that the textural enhancing properties are independent of the diacetyl or alpha acetolactic acid quantity in the ferment.

The milk product which is fermented is a liquid composition which contains milk components, and can be whey, sweet whey, acid whey, skim milk, whole milk, reconstituted milk, creamery buttermilk, whey protein concentrate, or similar product. The milk product is sterilized, to remove bacterial contaminants, prior to the fermentation.

The fermentation itself is conducted under anaerobic conditions at a pH between 4 and 7.5. The fermentate is then dried by any standard means, preferably by spray-drying.

The dried ferment is then added to the ingredients which are combined to prepare the desired food product. While the precise point at which the ferment is added can be varied as the individual application dictates, it will generally be added while the ingredients are in a dry or a liquid form, and prior to the cooking, whipping, and/or blending of the ingredients. The ferment is ordinarily combined with the food products in an amount ranging from 0.1 to 10% (by wt.), preferably 0.2 to 5% (by wt.), but the actual quantity will be dictated by the other ingredients and the ultimately desired result.

The baked goods with which the ferment can be combined include a variety of both yeast-raised and non-yeast products. The yeast raised baked goods include pastries, breads, rolls, and biscuits. Addition of the ferment to these products prior to baking, i.e. to the dry ingredients or the dough, preferably to the dry ingredients, results in a finished baked product having a greater height and volume than that observed without the ferment. Additionally, the finished baked products exhibit an enhanced texture and mouthfeel, and an extensive cell structure, imparting to it an improved softness in texture.

Non-yeast baked products include cookies, cakes, pie crusts, muffins, and pastries. Addition of the ferment to these products results in enhanced textural properties, especially smoothness and mouthfeel, and an extensive cell structure as obtained with the yeast raised bakery goods. Cakes to which the ferment has been added also exhibit greater heights and larger volumes. The ferment is added to the dry ingredients or the dough or batter prior to baking.

It has also been found that these enhanced properties are observed with microwave "baked" products, especially microwave cakes. In such products, those prepared with the added ferment exhibit enhanced textural properties similar to those in oven-baked cakes.

The whipped toppings with which the ferment can be used include cake icings and other whipped toppings such as whipped creams. The ferment is added to the product while in the liquid state (i.e. prior to whipping), and renders the mixture more easily whippable, i.e. reducing the time required to achieve a fully whipped product, often by as much as 50% or more.

The blended products with which the ferment can be used include puddings and mousses (instant and cooked), gravies, sauces, and soups. The ferment is generally added to the product before or during blending and generally improves the apparent viscosity of the product, imparting a rich and creamy texture to the products. The ferment can be added to the products as a neat powder or, if desired, can be blended with an edible material such as sweet whey. Since the sum concentration of diacetyl and alpha acetolactic acid in the dried ferment can vary, this blending affords an opportunity to reduce the concentration and, additionally, to produce a standardized product. While it has been found that the textural enhancing properties of the ferment are independent of this concentration, keeping the concentration low is recommended since diacetyl has distinct flavor and aromatic properties. In general, a sum concentration of 0-250 ppm, preferably 50-225 ppm, more preferably 150-200 ppm is adequate for most purposes although this can be varied as flavor requirements dictate.

EXAMPLES

The following examples further illustrate preferred embodiments of the invention and are not intended to be illustrative of all embodiments.

EXAMPLE 1

EXPERIMENTAL PROCEDURES

TRIANGULAR TESTS

To assess physical and/or organoleptic differences between products prepared with a given concentration of the ferment of the invention and those prepared with a different concentration, or no ferment at all, triangular test determinations were performed. In these tests, which are designed to test the effect of single variable on the organoleptic properties, test subjects select the odd sample without regard to preference.

Briefly, a number of control and test samples are prepared. In each blend determination the subject is presented with three samples; each determination will, thus, contain two controls and one test sample or one control and two test samples. The subjects are then asked to examine all three samples and to select which is the odd or unpaired sample. Results are reported as the number of "right" selections.

The subjects are instructed to select the odd sample without regard to preference; however, comments can be solicited regarding the subject's perception of the samples being examined; unsolicited comments can also be recorded. In this way, the general desirability of the differences can be evaluated. Unsolicited comments are particularly useful in this regard.

While these tests are primarily used in assessing the organoleptic properties of the samples such as mouthfeel, they also have utility in the assessment of physical properties such as smoothness or creaminess, etc. Thus, a wide array of properties can be examined.

TEXTURAL ANALYSIS

The textural properties of samples of cakes prepared with and without the ferment of this invention were examined using the Stevens LFRA texture analyzer. Briefly, the analyzer subjects the sample to a pressure from a probe of a known surface area; the resistance of the sample to this deforming pressure (in $gm/cm^2$) is recorded; a lower resistance is indicative of a softer texture, which is desirable in baked goods.

The cakes were also visually examined for evaluation of the cellular structure in the finished products. For these examinations, a 2.5 mm thick slice of the cake was taken and placed on an illuminated background. The slice was then visually inspected to ascertain the relative size, shape, and number of these cells, and was photographed to obtain a permanent record of the appearance.

EXAMPLE 2

EXAMINATION OF COOKIE AND CAKE ORGANOLEPTIC PROPERTIES

To assess the effects of the ferment of this invention on cakes and cookies, a series of triangular tests were conducted using the procedure described in Example 1. The ferment was used at a 5% (by wt.) level and was mixed with sweet whey to produce a combined diacetyl and alpha acetolactic acid concentration of approximately 250 ppm. In each test sample, the ferment was added to the ingredients prior to baking and mixing, and an equivalent amount of sweet whey was added to the control samples. Both samples were then baked under identical conditions.

In each trial, the evaluators were asked only to identify the odd sample, no instructions as to what properties were to be considered, were given. The evaluators were permitted to visually examine and consume the samples prior to their choice. Comments were not solicited, but any comments volunteered by the evaluators were recorded.

The results are presented below:

Cakes

In a series of experiments, single layer cakes were prepared using various mixes; half of each lot of cakes prepared contained 1% (by wt.) (trials 1 and 2) or 2% (trials 3–5) of the ferment while the remainder contained an equivalent amount of sweet whey. Samples were then presented to the evaluators as described above, with the following results:

TABLE I
Results of Cake Triangle Tests

| Trial | Cake | # Evaluators | Results Correct | Results Incorrect |
|---|---|---|---|---|
| 1 | Duncan Hines Chocolate | 10 | 6 | 4 |
| 2 | Duncan Hines Yellow | 21 | 10 | 11 |
| 3 | Scratch[a] (standard room light) | 17 | 16 | 1 |
| 4 | Scratch (testlight[b]) | 13 | 11 | 2 |
| 5 | Scratch (trimmed[c], test light) | 7 | 8 | 9 |
| | TOTALS | 78 | 51 | 27 |

[a] A dry cake mix consisting of 15.8% (by wt.) shortening, 24.95% sugar, 14.26% egg, 26.93% flour, 0.8% baking powder, 0.18% salt, 14.84% milk, 0.25% vanilla extract, 2% ferment or sweet whey.
[b] A red light designed to eliminate comparisons based on color
[c] The cake was manually trimmed to a standard size to eliminate comparisons based on cake size, etc.

The results demonstrate that in the five trials conducted, the odd sample was correctly selected by 51 out of 78 evaluators; this is highly significant as it is nearly twice what would be expected on the basis of chance alone. In each trial, the number of correct identifications always exceeded the $\frac{1}{3}$ probability which would be obtained on chance.

Cookies

A series of experiments were conducted using cookies, where the ferment was added to the cookie mix and optionally, an equivalent amount of shortening or flour was removed; in the controls, sweet whey was used in place of the ferment. The base recipe consisted of 42.8% flour, 17.9% sugar, 17.0% butter, 15.3% shortening, 5.3% egg yolk, 1.7% ferment or sweet whey (Note: in some trials an equivalent amount of flour or shortening was removed; in these trials all percentages would change accordingly.) The results are presented below:

TABLE II
Results of Cookie Triangle Test

| Trial | Ingredient Replaced | # Evaluators | Results Correct | Results Incorrect |
|---|---|---|---|---|
| 1 | None | 27 | 21 | 6 |
| 2 | Flour | 22 | 12 | 10 |
| 3 | Shortening | 22 | 15 | 7 |
| | TOTALS | 71 | 48 | 23 |

As with the cakes, a highly significant number of correct selections was made.

Comments

Based on the results of the cookie and cake trials, the unsolicited comments made by the persons who correctly identified the odd sample were analyzed and any evaluators making no comments or any comments not relating to textural differences were removed from consideration. The remainder of the comments were evaluated to determine if the evaluators discerned any positive textural advantages of the ferment containing product as compared with those of the controls. The results are presented below:

| Type | # Evaluators | Better Textural Properties Invention | Better Textural Properties Control |
|---|---|---|---|
| Cake | 37 | 25 | 12 |
| Cookie | 31 | 27 | 4 |

These results are highly significant and demonstrate that a large majority of those persons recognizing any textural differences note that the ferment containing cakes and cookies have superior properties, notably in mouthfeel, moistness, higher volume and even cell structure (cakes), and firmer texture (cookies).

EXAMPLE 3

TEXTURAL ANALYSES OF CAKES

To further assess the textural enhancing effects the ferment imparts to baked cakes, duplicate lots of cupcakes were prepared using 1, 2, and 5% (by weight) ferment, or an equivalent amount of sweet whey for the controls. The ferment, which contained approximately 500 ppm of diacetyl and/or alpha acetolactic acid, was added to the ingredients prior to mixing, and the cupcakes were made from the folowing recipes:

| Ingredient | % Ferment 1% | % Ferment 2% | % Ferment 5% |
|---|---|---|---|
| Shortening | 15.8% | 15.8% | 15.8% |
| Sugar | 24.95% | 24.95% | 24.95% |
| Egg | 14.26% | 14.26% | 14.26% |
| Flour | 27.93% | 26.93% | 23.93% |
| Ferment/Sweet Whey | 1.0% | 2.0% | 5.0% |
| Baking Powder | 0.80% | 0.80% | 0.80% |
| Salt | 0.18% | 0.18% | 0.18% |
| Milk | 14.84% | 14.84% | 14.84% |
| Vanilla Extract | 0.25% | 0.25% | 0.25% |

All percentages are by weight based on the total weight of the composition.

Samples of each lot of cupcakes were examined in the texture analyzer as described in Example 1 just after baking and cooling (Day 1), 24 hours later (Day 2), and 24 hours after the second reading (Day 3). The results are graphically presented in FIG. 1.

As shown, it can be seen that the samples containing the ferment, regardless of concentration, consistently displayed the softer, more desirable texture (as compared with the control) even after three days. Further, this soft texture was enhanced by increasing the amount of ferment present.

Samples of the cupcakes made with 5% ferment and the controls were also sliced (into 2.5 mm thick slices) and examined for cell structure under an 8X power microscope. Those prepared with the ferment demonstrated a more extensive cell structure than the controls, with deeper passages. Representative micrographs of these samples are presented in FIG. 2. As shown, the sample prepared with the ferment has more extensive tunnelling, as evidenced by the large amount of light (bright spots) transmitted through the slice.

Figure 2B:
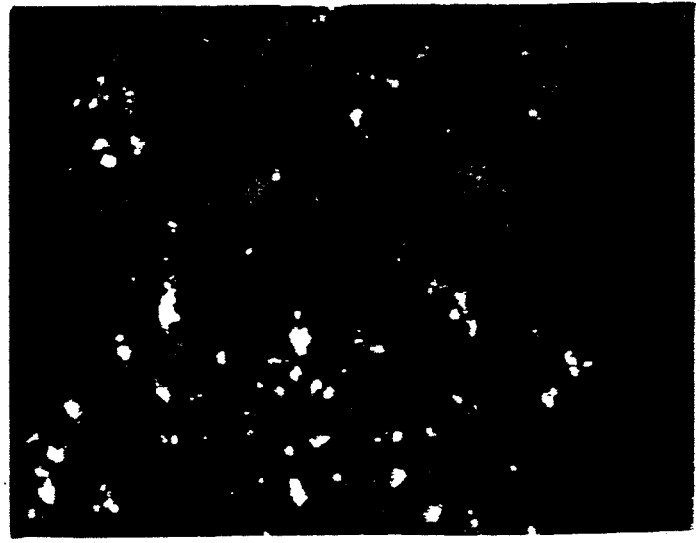
Figure 3A:
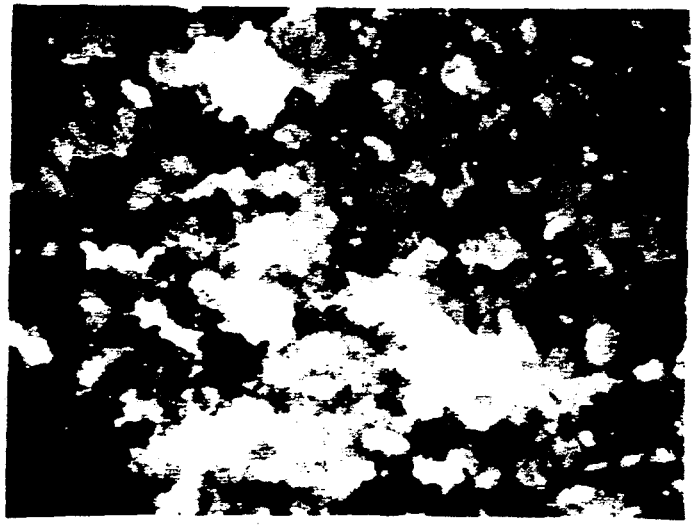
FIG. 3 is a composite of micrographs exhibiting the cellular structure obtained with 5% (by wt.) ferment (containing 109 ppm diacetyl and/or alpha acetolactic acid) and sweet whey, at an 8× magnification.
Figure 3B:
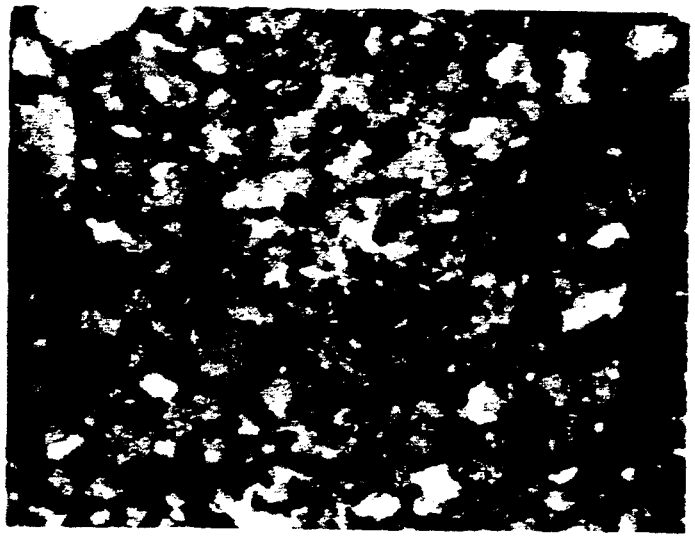

A separate lot of cupcakes was prepared utilizing a ferment having a combined diacetyl/alpha acetolactic concentration of 109 ppm, and the cell structure was examined; a micrograph of a representative sample is presented in FIG. 3. The cell structure and extent of tunnelling is nearly identical to that obtained with the 500 ppm ferment (FIG. 2). This tunnelling directly affects the texture of the cake, imparting a softer texture and more pleasing mouthfeel to it.

Thus, the texture enhancing effect of the ferment is independently of diacetyl/alpha acetolactic acid concentration.

EXAMPLE 4

EXAMINATION OF CAKE HEIGHT

Figure 4:
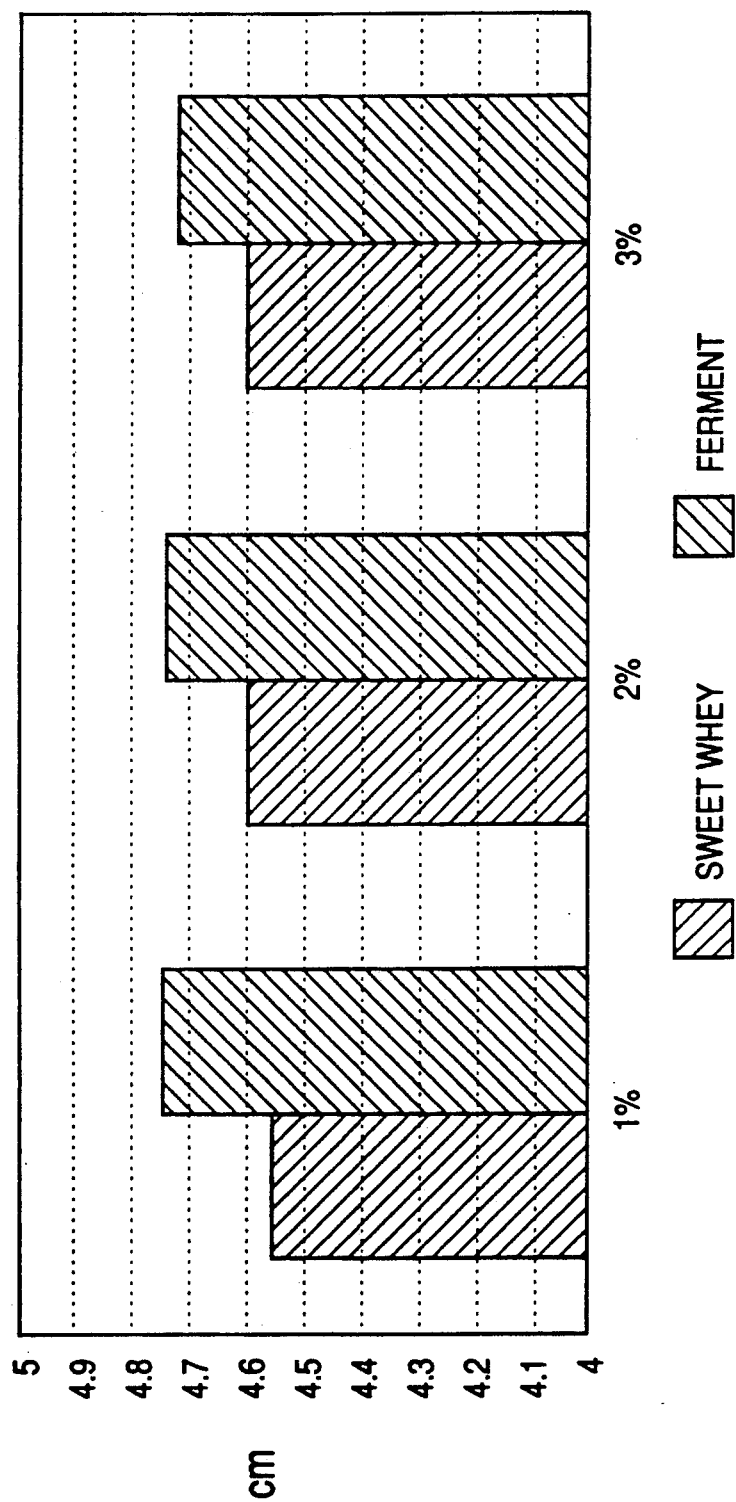
FIG. 4 is a graphical representation of cake height observed in cakes prepared with 1%,2%, and 5% (by wt.) ferment and sweet whey (control).

To further assess the effects of the ferment on physical properties of cakes, samples of cupcakes from the scratch mix of Example 2 were examined for volume and height. The height, in cm, was measured at the highest point using a scale. The results are presented in FIG. 4. As shown, the cupcakes prepared with the ferment exhibit higher heights and larger volumes, both desirable traits, than the controls prepared with the sweet whey.

EXAMPLE 5

USE OF FERMENT IN PUDDINGS

In a series of experiments, the effect of the ferment on puddings was examined. The puddings were prepared using 0.32% (by weight) of the ferment, or an equivalent amount of sweet whey for the controls. The ferment, which contained approximately 500 ppm of diacetyl and/or alpha acetolactic acid, was added to the ingredients prior to mixing. The puddings examined were of the following formulations:

Instant Pudding 3.22% shortening, 14.7% sugar, 0.48% tetrasodium pyrophosphate, 0.30% disodium phosphate, 0.11% emulsifier, 0.13% cocoa butter, 0.08% non-fat dry milk, 0.02% soya lecithin, 0.002% color, 80.63% milk, 0.32% ferment or sweet whey. (This was prepared by mixing at low speed followed by chilling in a refrigerator for 15-20 minutes to set).

Cooked Pudding

Jello ® brand vanilla pudding, purchased commercially, was prepared according to the manufacture's direction, except for the addition of the ferment or sweet whey.

Immediately upon mixing, the pudding samples containing the ferment exhibited a visibly thicker, more creamy viscosity. After setting, samples of each were tasted. The puddings containing the ferment possessed a more creamy texture and a more desirable mouthfeel than the controls. The differences were particularly noticeable with the instant puddings, in which the controls appeared coarse in texture, with a thin, watery mouthfeel.

separate samples of the puddings were permitted to remain undisturbed in the refrigerator for 72 hours. After this time, the upper surface of the control appeared cracked and broken while that of the samples containing the ferment was smooth and unbroken. Thus, the ferment stabilizes the puddings from this deleterious effect of aging.

EXAMPLE 6

USE OF FERMENT IN WHIPPED CREAMS

To assess the effect of the ferment on whipped products, a series of whipping cream mixtures were made as follows:

| Ingredient | Formulation No. | | | | | | |
|---|---|---|---|---|---|---|---|
| | 1 | 2 | 3 | 4 | 5 | 6 | 7 |
| Heavy Cream | 150 | 150 | 150 | 150 | 150 | 150 | 150 |
| Fine Sugar | — | 8.5 | — | 8.5 | 8.5 | 8.5 | 8.5 |
| Sweet Whey | — | — | — | 0.79 | — | — | — |
| Ferment | — | — | 0.75 | — | 0.32 | 0.79 | 2.22 |
| % Ferment/Sweet Whey | — | — | 0.5% | 0.5% | 0.2% | 0.5% | 1.4% |

These mixtures were examine for viscosity using a Brookfield Viscometer in the following determinations.

Unwhipped

The viscosities of formulations 1 to 3 were examined immediately after preparation; neither formulation was whipped, although formulation 3 was stirred gently to dissolve the ferment. Both samples had a viscosity of 200 cps. Formulation 3 retained this viscosity for 24 hours.

A parallel series of tests utilizing formulations 2 and 7 revealed similar results, both exhibited identical viscosities (170 cps).

Thus, it appears that the ferment does not affect the viscosity of the unwhipped products.

Whipped

Formulations 2, 4, 5, 6, and 7 were whipped for 1½ minutes on high and 30 seconds on medium using a standard mixer. Immediately thereafter, the viscosities were measured with the following results:

2—19,000 cps
4—25,000 cps
5—48,000 cps
6—70,000 cps

7—67,000 cps.

Thus, the ferment greatly increases the viscosity of the whipped product, making it thicker and, thus, more creamy. The same was not observed for an equivalent amount of sweet whey.

EXAMPLE 7

TEXTURAL TESTS

The textural enhancing properties of the ferment were further examined in pancake and microwave cakes using the procedure described in Example 1.

The pancakes were prepared using the following recipe:

| | |
|---|---|
| Flour | 29.34% (by wt.) |
| Ferment (sweet whey) | 1.50% |
| Sugar | 0.94% |
| Baking Powder | 0.84% |
| Salt | 0.75% |
| Baking Soda | 0.62% |
| Milk | 51.66% |
| Eggs | 11.21% |
| Oil | 3.14% |

After mixing, the pancackes were cooked on a griddle. In duplicate texture analyses, the following results were obtained:

| | 1 | 2 |
|---|---|---|
| Control | 50.00 gm/cm$^2$ | 40.50 gm/cm$^2$ |
| With Ferment | 43.25 gm/cm$^2$ | 37.50 gm/cm$^2$ |

Again, the ferment produced a softer texture.

Microwave cakes were prepared from the recipe.

| | |
|---|---|
| Pillsbury yellow cake mix | 46.43% (by wt.) |
| Water | 29.88% |
| Oil | 11.84% |
| Eggs | 9.55% |
| Ferment (sweet whey) | 2.30% |

After mixing, the batter was poured into a microwave pan and microwaved on a high setting for 7 minutes. In triplicate texture analyses, the following results were obtained:

| | 1 | 2 | 3 |
|---|---|---|---|
| Control | 108 gm/cm$^2$ | 127 gm/cm$^2$ | 96 gm/cm$^2$ |
| Ferment | 93 gm/cm$^2$ | 100 gm/cm$^2$ | 91 gm/cm$^2$ |

Again, the ferment produced a softer texture.

EXAMPLE 8

SUBJECTIVE EVALUATIONS

To determine the effect of the ferment with other cultured dairy powders, a series of experiments were run using the following:

| | |
|---|---|
| 1 | Control (sweet whey) |
| 2 | Ferment |
| 3 | Mid-America high acid buttermilk |
| 4 | Beatrice Buttermilk 983 |
| 5 | Mid-America non-fat dry milk |

The powders were used at a 2.3% level (by wt.) in the microwave cake mix of Example 7 and 0.5% in the cream of mushroom soup. The following results were obtained:

| Sample | Microwave Cake Observation |
|---|---|
| 1 | heavy, greenish color-off odor and taste |
| 2 | improved texture, odor, color - more delicate crum |
| 3 | heavy, brown color, rough texture, sour off-note |
| 4 | slight sour note, higher rise, drier texture |
| 5 | higher rise, drier texture, flavor not improved |

Thus, the ferment produces a textural enhancement as good as, and generally better than, the other powders.

| Sample | Mushroom Soup Observation |
|---|---|
| 1 | smooth, sweet, musty |
| 2 | smooth, fatty mouthfeel, creamier |
| 3 | smooth, slight sour dairy note, thinner |
| 4 | sour dairy note, less thick |
| 5 | smooth, creamy |

Again, the ferment produced a textural enhancement, and produced the only effect on mouthfeel.

It is apparent that many modifications and variations of this invention as hereinabove set forth may be made without departing from the spirit and scope thereof. The specific embodiments are given by way of example only and the invention is limited only by the terms of the appended claims.

What is claimed is:

1. A method for preparing a blended food composition having enhanced textural properties of viscosity, richness, creaminess and mouth feel, wherein food ingredients are blended or mixed together comprising adding to said composition from about 0.1 to about 10% by weight based on the total weight of composition, of a dried ferment comprising the product produced by the fermentation of a pasteurized milk product by a culture of *Streptococcus diacetilactics* such that the ferment contains a concentration of 0–500 ppm of diacetyl and alpha acetolactic acid.

2. The method of claim 1 wherein the *Streptococcus diacetilactis* is mixed with organisms selected from the group consisting of *Streptococcus lactis*, *Streptococcus cremoris*, and mixtures thereof.

3. The method of claim 1 or 2 wherein the ferment contains a concentration of 0–250 ppm of diacetyl and alpha acetolactic acid.

4. The method of claim 1 or 2 wherein the dried ferment is added to said product prior to or during blending.

5. The method of claim 4 wherein the ferment further comprises an edible material in admixture with it.

6. The method of claim 5 wherein the edible material is sweet whey.

7. The method of claim 1 or 2 wherein the milk product is selected from the group consisting of whey, sweet whey, acid whey, skim milk, whole milk, reconstituted milk, creamery buttermilk, and whey protein concentrate.

8. The method of claim 1 or 2 wherein the blended food composition is selected from the group consisting of instant puddings, cooked puddings, instant mousses, cooked mousses, gravies, sauces, and soups.

9. A blended food composition prepared by the method of claim 1 or 2.

* * * * *